United States Patent
Kawabata et al.

[11] 3,910,849
[45] Oct. 7, 1975

[54] METHOD FOR MANUFACTURE OF ACTIVATED CARBON AND APPARATUS THEREFOR

[75] Inventors: Jun-Ichi Kawabata; Yonesiro Tazaki, both of Sapporo; Shigeo Mitsui, Ebetsu; Kazuhiko Niikawa, Sapporo, all of Japan

[73] Assignee: Agency of Industrial Science & Technology, Tokyo, Japan

[22] Filed: Jan. 4, 1974

[21] Appl. No.: 430,664

[30] Foreign Application Priority Data
Jan. 5, 1973  Japan.................................. 48-2097

[52] U.S. Cl................ 252/421; 23/277 R; 201/31; 202/121; 209/474; 252/445
[51] Int. Cl.²........................................... B01J 37/00
[58] Field of Search........... 252/421, 445; 23/277 R; 209/474; 201/31; 202/121; 423/449, 445

[56] References Cited
UNITED STATES PATENTS
3,541,025   11/1970   Oda et al. ......................... 252/421
3,565,827   2/1971   Friday ................................ 252/421

FOREIGN PATENTS OR APPLICATIONS
927,926   5/1955   Germany ........................... 252/445

*Primary Examiner*—Patrick P. Garvin
*Assistant Examiner*—P. E. Konopka
*Attorney, Agent, or Firm*—Oblon, Fisher, Spivak, McClelland & Maier

[57] ABSTRACT

At least two horizontal perforated plates are vertically spaced. A powdered or granular carbonaceous substance is fed onto the lowermost of the perforated plates and, at the same time, a hot activating gas is introduced upwardly from below the lowermost horizontal perforated plate so that the activated portion of said powdered or granular carbonaceous substance is allowed to ascend to and form a fluidized bed on successively higher perforated plates. The activated carbon of the highest grade of quality collects on the uppermost perforated plate as the final product.

The manufacture of activated carbon described above is accomplished by use of an apparatus which comprises, in combination, at least two horizontal perforated plates having holes of a fixed diameter distributed at a fixed rate, two inlets disposed at a lower part of the apparatus, one for admitting the carbonaceous substance and the other for permitting introduction of the activating gas, and two outlets disposed at an upper part of the apparatus, one for discharging the activated carbon as the product and the other for releasing the spent activating gas.

2 Claims, 3 Drawing Figures

METHOD FOR MANUFACTURE OF ACTIVATED CARBON AND APPARATUS THEREFOR

BACKGROUND OF THE INVENTION

This invention relates to a method for the manufacture of activated carbon by the activation of a carbonaceous substance and to an apparatus employed therefor.

It has been known to manufacture activated carbon by activating a carbonaceous substance in accordance with a fluidizing method.

The fluidizing method accomplishes the activation of the carbonaceous substance by use of overflow type stepped fluidized beds which are hot fluidized beds each formed of steam and a powdered or granular carbonaceous substance.

According to this method, the retention time of the carbonaceous substance within the fluidized beds is not constant, namely the retention time varies widely with the size of individual particles constituting the powdered or granular substance being activated. Accordingly, the quality of the formed activated carbon is highly inconstant. Thus, this method only yields a product of poor quality as activated carbon goes.

SUMMARY OF THE INVENTION

According to this invention, a powdered or granular carbonaceous substance such as, for example, powdered or granular coal is fed onto the lowermost of at least two horizontal perforated plates which are vertically spaced. At the same time, a hot activating gas such as, for example, the combustion gas of propane is caused to ascend in conjunction with steam, while still at an elevated temperature, through the horizontal perforated plates from below the lowermost plate. Consequently, the powdered or granular coal is gradually activated. The portion of the powdered or granular coal which has been activated to a certain level is allowed to ascend through the successively higher horizontal perforated plates. The activated coal particles which have thus ascended to the higher horizontal perforated plates form a fluidized bed on each of these plates. The activated carbon which is finally discharged, therefore, is of a very constant degree of activation and is a product of high quality. In order to preclude possible nonuniformity in the degree of activation achieved for the individual carbonaceous particles in the fluidized bed on each perforated plate, it is prerequisite that both the diameter and distribution rate of the holes pierced through each horizontal perforated plate should be limited in respectively fixed ranges. The apparatus of the present invention is intended for use in practicing the method described above. It comprises a column which contains at least two vertically spaced horizontal perforated plates and is provided at the lower portion with two inlets, one for introducing the activating gas and the other for admitting the carbonaceous substance subjected to activation, and at the upper portion with two outlets, one for releasing the spent activating gas and the other for discharging the formed activated carbon.

The multiplicity of holes pierced through the lowermost horizontal perforated plate have a fixed diameter in the range between 1 and 2 mm and a total area corresponding to 0.5 to 2 percent of the whole area of the plate. In any of the other horizontal perforated plates used in the apparatus, the multiplicity of holes pierced therethrough have a fixed diameter which is 2 to 4 times as large as the diameter of individual particles of the powdered or granular carbonaceous substance being activated and a total area which corresponds to 20 to 30 percent of the whole plate area.

A primary object of the present invention is to provide a method for the manufacture of activated carbon of high quality and excellent properties by the fluidized activation of a carbonaceous substance.

Another object of this invention is to provide an apparatus for the manufacture of activated carbon enjoying high quality and excellent properties by the fluidized activation of a carbonaceous substance.

DETAILED DESCRIPTION OF THE INVENTION

The method of the present invention accomplishes the manufacture of activated carbon of high quality and excellent properties by the fluidized activation of a carbonaceous substance. This method requires use of a column the interior of which is partitioned by at least two vertically spaced horizontal perforated plates. A powdered or granular carbonaceous substance is introduced in conjunction with an activating gas, while still at an elevated temperature, upwardly through the plates from the bottom of the column so as to have the particles of the carbonaceous substance form a fluidized bed on each of the horizontal perforated plates. In this case, each fluidized bed functions to classify the particles involved therein. Owing to this function, the portion of carbonaceous particles on which the activation has proceeded to a certain extent in each fluidized bed is caused to transfer to a successively higher fluidized bed and is subjected thereon to further activation. The portion of carbonaceous particles which is to be finally removed from the uppermost horizontal perforated plate is composed exclusively of particles which have been activated to the maximum extent and which, accordingly, form an activated carbon of high quality and excellent properties.

When the powdered or granular carbonaceous substance is subjected to activation, it has its particle diameter and bulk density both reduced. When such carbonaceous substance forms a fluidized bed in conjunction with an activating gas, therefore, the particles thereof undergo classification as a natural consequence. This means that only the portion of the carbonaceous substance on which the activation has proceeded to a certain advanced stage is allowed to ascend to the next higher fluidized bed. The duration of retention of individual carbonaceous particles in each fluidized bed, therefore, is substantially constant, namely the length of period in which the individual carbonaceous particles remain in motion within the fluidized bed is dispersed only over a small range. Accordingly, the activated carbon finally produced enjoys homogeneous and excellent quality.

A typical procedure for practicing the method of this invention by the use of the apparatus which is also provided by this invention will be described herein below with reference to FIG. 1.

Figure 1:
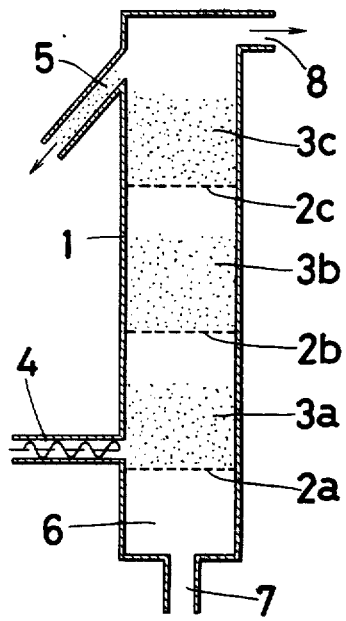
FIG. 1 is a sectional view of one preferred embodiment of the apparatus acording to the present invention.

Referring to FIG. 1, 1 denotes a column serving as the outer covering of the apparatus according to this invention. The interior of the column 1 is partitioned into chambers 3a, 3b and 3c for activation of carbonaceous substance by having horizontal perforated plates 2a, 2b and 2c vertically spaced stepwise therein.

An inlet 4 for introducing the carbonaceous substance subjected to activation opens into the lowermost activation chamber 3a and an inlet 7 for admitting the activating gas is disposed below the lowermost horizontal perforated plate 2a. An outlet 5 for discharging the formed activated carbon and an outlet 8 for releasing the spent activating gas are disposed in the upper part of the uppermost activation chamber 3c.

Although three horizontal perforated plates are in use in the illustrated apparatus, the number of horizontal perforated plates to be incorporated in the apparatus may be 2 or 4 or more, depending on the kind of carbonaceous substance used and the grade of quality of the activated carbon desired to be produced. Generally, two or three plates will suffice.

As the carbonaceous substance for raw material, there can be used coal, wood dust, bark and coconut husks, or the like. Such substance is required to be powdered or granulated into particles having a particle diameter of up to 5 mm, preferably between 0.1 and 2.0 mm. prior to use.

The activating gas for use in this invention is required to be supplied at an elevated temperature generally in a range between 800°C and 1,000°C, to be capable of forming in the individual carbonaceous particles a multiplicity of fine pores of the order of several Angstroms (A) to 10s of Angstroms (A) and to keep from exerting any adverse effects on the formed activated carbon. A gas having a high oxygen content is undesirable, for it burns up the carbonaceous substance without forming therein desired fine pores in the course of activation. A hot mixed gas consisting of steam and the gas resulting from the combustion of a hydrocarbon satisfies the requirement described above. For example, the gas obtained by burning the gas spontaneously emanating from coal mine pits can be used. Actually, the activating gas is selected by taking into due consideration the kind of the carbonaceous substance in use and the activating temperature proper to said carbonaceous substance.

The carbonaceous substance is continuously introduced through the inlet 4 into the lowermost activation chamber 3a, and more specifically onto the lowermost horizontal perforated plate 2a, by means of a screw conveyor for example. A hot mixed gas consisting of steam and the gas formed by the combustion of a hydrocarbon is continuously introduced thereto via the inlet 7. Consequently, the carbonaceous substance and the hot mixed gas form a fluidized bed inside the activation chamber 3a.

In this fluidized bed, the carbonaceous substance is activated and, in consequence of this activation, the portion of carbonaceous particles on which the activation has proceeded to a certain extent has its particle diameter reduced. Only the portion of carbonaceous particles which has been reduced in particle diameter is caused to transfer in conjunction with the ascending activating gas, from the activation chamber 3a, through the horizontal perforated plate 2b into the activation chamber 3b, wherein it forms a fluidized bed. In this manner, the carbonaceous substance is allowed, as the activation gradually proceeds, to transfer to successively higher activation chambers wherein it forms fluidized beds, one in each activation chamber, and undergo further activation. The carbonaceous substance which is collected in the uppermost activation chamber 3c and then removed therefrom through the outlet 5 is composed exclusive of particles which have been activated to the maximum extent and which, therefore, form an activated carbon of high quality and excellent properties.

In order that the carbonaceous substance, after having been activated to a certain extent, may be caused to transfer from one activation chamber to a successively higher activation chamber through an intervening horizontal perforated plate and form a sufficiently stable fluidized bed therein, it is imperative that a space of certain dimensions should intervene between the fluidized bed formed in each activation chamber and the horizontal perforated plate serving as the bottom of the next higher activation chamber. The height of this intervening space is determined by various factors including the flow velocity of the activating gas, the particle diameter of the carbonaceous substance, the diameter of holes pierced through the horizontal perforated plates, the ratio of the total area of holes to the total plate area, etc.

Besides being activated in each fluidized bed, the carbonaceous substance is caused to transfer from the lower to the higher activation chambers and consequently undergo classification as described above. The efficiency of this classification heavily hinges upon the ratio of the total area of holes to the total plate area in each horizontal perforated plate.

This ratio can be expressed by the following formula:

$$\frac{\text{Total area of holes taken together}}{\text{Apparent area of horizontal perforated plate}} \times 100 \text{ (percent)} = \text{Hole ratio}$$

When the hole ratio is small, then the velocity at which the gas passes through the holes in the horizontal perforated plate is increased so that even the insufficiently activated portion of carbonaceous particles is permitted to transfer to the upper activation chamber. When the hole ratio is large, the flow velocity is lowered so that even the sufficiently activated portion of carbonaceous particles fails to transfer to the upper activation chamber. This is equivalent to saying that the efficiency of classification is extremely inferior when the hole ratio is not proper.

The conditions to be fulfilled in obtaining the highly efficient classification are determined by factors such as the kind of particular carbonaceous substance used, the granularity, particle diameter, density and particle diameter distribution of the carbonaceous substance, etc.

The present inventors conducted research to find what conditions should be fulfilled to obtain desired classification. Consequently, they have ascertained it imperative that the velocity of the activating fluid should be selected in a range of from about 3 times to about 10 times the minimum velocity required for fluidizing the carbonaceous substance in use, that the diameter of the holes pierced through the lowermost horizontal perforated plate should be selected in a range of 1 to 2 mm and the hole ratio thereof in a range of 0.5 to 2.0 percent, and that the diameter of the holes pierced through the other horizontal perforated plates should be selected in a range of from 2 times to 4 times the largest diameter of the particles of the carbonaceous substance in use and the hole ratio thereof in a range of 20 to 30 percent.

The present invention will be described in further detail with reference to working examples to be cited herein below. These examples are intended to illustrate the invention and are not to be construed as limiting the scope of this invention in any way.

EXAMPLE 1

An apparatus according to this invention having a structure illustrated in FIG. 1, with the exception of the horizontal perforated plate 2c and the activation chamber 3c was used. In this apparatus, the column 1 had an inside diameter of 500 mm, the first activation chamber 3b had a height of 1,700 mm, the diameter of the holes pierced through the lowermost horizontal perforated plate 2a was 2 mm and the hole ratio thereof was 1 percent, the diameter of the holes pierced through the second horizontal perforated plate 2b was 5 mm and the hole ratio thereof was 20 percent, and the outlet 5 for removing the formed activated carbon was disposed at a height of 500 mm from the second horizontal perforated plate 2b. A carbonaceous substance obtained by dry distilling at 450°C Sunakawa coal produced at Sunakawa, Hokkaido, Japan was used as the raw material. This carbonaceous substance had a maximum particle diameter of 2.0 mm, an average particle diameter of 1.0 mm, a bulk density of 0.3 g/cm$^3$, a minimum fluidizing velocity of 30 cm/sec. a methylene blue adsorption capacity of 0, a water content of 2.1, an ash content of 7.2, a volatile matter content of 28.9 and a fixed carbon content of 61.8.

Said carbonaceous substance was continuously fed by a screw feeder into the first activation chamber through the inlet 4 and, at the same time, a mixed gas consisting of steam and the combustion gas of propane was introduced via the inlet 7 at a rate, by volume basis, of 18.4 cm/sec. (normal room temperature and atmospheric pressure), with the result that a fluidized bed was formed each in the activation chambers 3a and 3b. The temperature of the fluidized bed in the first chamber was 920°C and that of the fluidized bed in the second chamber was 895°C. An activated carbon having the following physical properties was discharged continuously through the outlet 5:

| | |
|---|---|
| Maximum particle diameter | 1.6 mm |
| Average particle diameter | 0.7 mm |
| Bulk density | 0.2 g/cm$^3$ |
| Methylene blue adsorption capacity | 201 mg/g |

It is clear from this table that the activated carbon thus produced enjoyed high grade of quality and excellent properties. The "methylene blue adsorption capacity" means the property of the activated carbon to indicate the grade of its quality and it was determined in accordance with the method designated by JIS (Japanese Industrial Standards).

EXAMPLE 2

An apparatus entirely similar to that of Example 1, except that the inside diameter of the shell was 105 mm, was used. Activated carbon was produced by using carbonaceous substances of the following descriptions.

| | Sunakawa coal | Griffin coal | Bark |
|---|---|---|---|
| Maximum particle diameter (mm) | 2.0 | 3.0 | 2.0 |
| Average particle diameter (mm) | 1.0 | 1.5 | 1.0 |
| Bulk density (g/cm$^3$) | 0.38 | 0.65 | 0.25 |
| Minimum fluidizing velocity (cm/sec) | 29.5 | 27.0 | 2.0 |
| Methylene blue adsorption capacity (mg/g) | 0 | 0 | 0 |
| Water content (percent) | 2.1 | 2.0 | 2.2 |
| Ash content (percent) | 7.2 | 4.3 | 4.0 |
| Volatile matter content (percent) | 28.9 | 19.5 | 23.6 |
| Fixed carbon content (percent) | 61.8 | 74.2 | 70.2 |

The activated carbon consequently obtained was found to have the following properties:

| | Sunakawa coal | Griffin coal | Bark |
|---|---|---|---|
| Maximum particle diameter (mm) | 1.6 | 2.0 | 1.3 |
| Average particle diameter (mm) | 0.7 | 1.0 | 0.6 |
| Bulk density (g/cm$^3$) | 0.2 | 0.5 | 0.1 |
| Methylene blue adsorption capacity (mg/g) | 220 | 320 | 300 |

It is apparent from the table that the activated carbon thus produced enjoyed high grade of quality.

EXPERIMENT

An experiment was conducted to demonstrate that the method and the apparatus according to this invention is effective in classifying carbonaceous particles on which the activation had proceeded to a certain extent. In this experiment was used an apparatus contemplated by the present invention and having the construction illustrated in FIG. 1. In this apparatus, the column had an inside diameter of 100 mm, the first activation chamber had a height of 30 cm, the second activation chamber a height of 30 cm, the third activation chamber a height of 40 cm, and the outlet for discharging the formed activated carbon was disposed 25 cm above the third horizontal perforated plate. The holes pierced through the horizontal perforated plates were as follows:

|  | First plate | Second plate | Third plate |
|---|---|---|---|
| Hole ratio (percent) | 1 | 20 | 20 |
| Hole diameter (mm) | 2 | 5 | 5 |

A granulated coal having an average particle diameter of 1.0 mm, a bulk density ($\rho b$) of 0.68 g/cc, a minimum fluidizing velocity (Umf) of 31.5 cm/sec and a methylene blue adsorption capacity 0 and an activated carbon having an average particle diameter of 0.7 mm, a bulk density of 0.28 g/cc, a minimum fluidizing velocity of 22.0 cm/sec and a methylene blue adsorption capacity of 54.2 mg/g were mixed to prepare a test specimen having a bulk density of 0.50 g/cc. This test specimen was introduced into the activation chamber 3a and was fluidized for 50 minutes by introducing air at a flow rate of 70 cm/sec on the empty column volume basis. Thereafter, the portions of the specimen fluidized in the activation chambers 3a, 3b and 3c were examined for particle diameter distribution, bulk density and methylene blue adsorption capacity. The results obtained are shown in FIG. 2 and FIG. 3.

Figure 2:
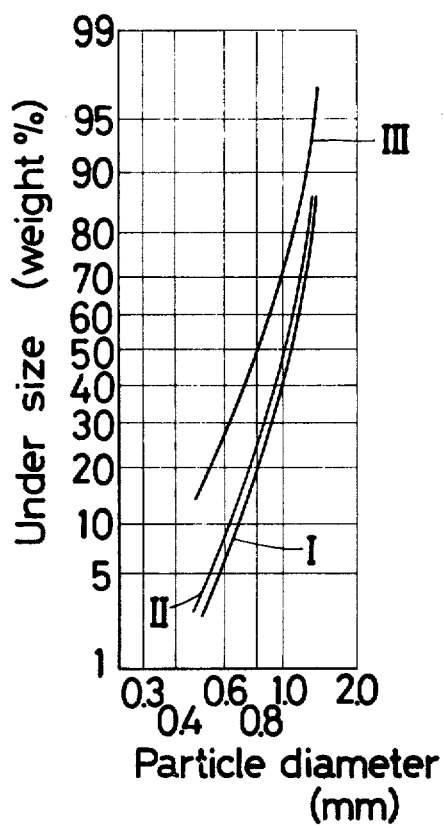
FIG. 2 is a graph indicating the particle diameter distributions of carbonaceous substance in the different activation chambers involved in the experiment cited.
Figure 3:
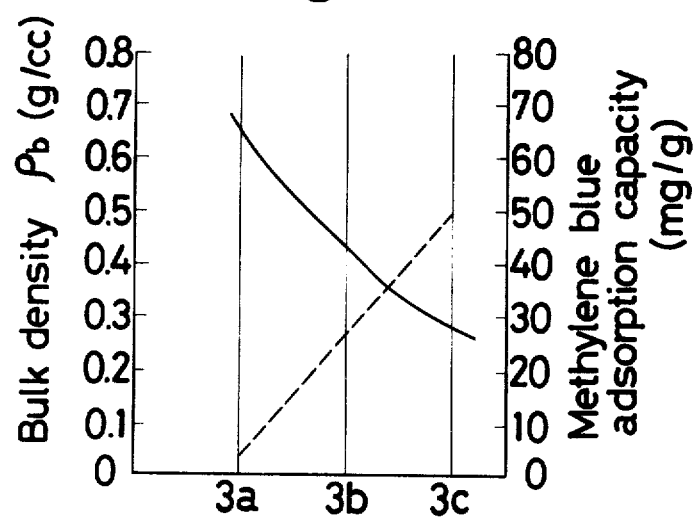
FIG. 3 is a graph indicating the values of adsorbing ability and bulk density exhibited by the carbonaceous substance in the different activation chambers involved in the experiment cited.

FIG. 2 is a graph indicating the particle diameter distribution of the carbonaceous substance in each activation chamber, with the horizontal axis graduated for particle diameter and the vertical axis for weight percent of classified particles. In this graph, Curve I represents the values of particle diameter distribution obtained in the activation chamber 3a, Curve II those obtained in the activation chamber 3b and Curve III those obtained in the activation chamber 3c respectively. It is clear from this graph that the particle diameter decreased in the ascending order of the activation chambers. FIG. 3 is a graph indicating the bulk density (in solid line) and the methylene blue adsorption capacity (in dotted line) of the carbonaceous particles fluidized in the activation chambers. It is clear from this graph that the portion of carbonaceous particles fluidized in the activation chamber 3c had a methylene blue adsorption capacity of 50 mg/g and a bulk density of 0.28 g/cc, the values which were the same as those of the physical properties of the activated carbon originally incorporated in the test specimen. From this, it is evident that the activated carbon component could be separated from the mixture by practicing the method of this invention by the use of the apparatus contemplated by this invention.

What is claimed is:

1. A method for the manufacture of an activated carbon from a powdered or granular carbonaceous substance selected from the group consisting of coal, wood dust, bark, and coconut husk comprising the steps of feeding the powdered or granular carbonaceous substance onto the lowermost of at least two horizontal perforated plates vertically spaced within a substantially uniform diameter column, said horizontal perforated plates being so adapted that the diameter of the holes pierced through the lowermost horizontal perforated plate is 1 to 2 mm and the hole ratio thereof is 0.5 to 2.0% and the diameter of the holes pierced through the second and subsequent horizontal perforated plates is 2 to 4 times the maximum diameter of the particles of carbonaceous substance and the hole ratio thereof is 20 to 30%, and at the same time causing a hot activating gas to ascend from below said lowermost horizontal perforated plate, the flow velocity of said activating gas being from 3 to 10 times the minimum flow velocity required for fluidizing the carbonaceous substance, thereby forming a fluidized bed of powdered or granular carbonaceous substance on each of said horizontal perforated plates and allowing only the portion of carbonaceous particles which have had their diameter reduced in consequence to the resultant activation in one of said fluidized beds to pass through a next higher horizontal perforated plate in conjunction with the ascending activating gas and, after the activating gas entraining the activated carbonaceous substance has reached the fluidized bed formed on the uppermost horizontal perforated plate, permitting the gas to be separated from the activated carbonaceous substance and to discharge through the topmost portion of the column, and separately recovering the activated carbonaceous substance from above the uppermost horizontal plate.

2. A method according to claim 1, wherein the activating gas is a hot mixed gas consisting of steam and the gas formed by the combustion of a hydrocarbon.

* * * * *